(12) United States Patent
Ko et al.

(10) Patent No.: US 12,518,667 B2
(45) Date of Patent: Jan. 6, 2026

(54) DISPLAY APPARATUS AND OPERATING METHOD THEREOF

(71) Applicant: SAMSUNG ELECTRONICS CO., LTD., Suwon-si (KR)

(72) Inventors: Euna Ko, Suwon-si (KR); Yunsu Kim, Suwon-si (KR); Sehyun Kim, Suwon-si (KR); Jongin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 411 days.

(21) Appl. No.: 18/092,714

(22) Filed: Jan. 3, 2023

(65) Prior Publication Data

US 2023/0146209 A1    May 11, 2023

Related U.S. Application Data

(63) Continuation of application No. PCT/KR2022/014851, filed on Sep. 30, 2022.

(30) Foreign Application Priority Data

Sep. 30, 2021    (KR) .................. 10-2021-0130286

(51) Int. Cl.
*G09G 3/20* (2006.01)
*H04N 21/44* (2011.01)

(52) U.S. Cl.
CPC ......... *G09G 3/20* (2013.01); *H04N 21/44004* (2013.01); *A63F 2300/534* (2013.01); *G09G 2360/18* (2013.01); *G09G 2370/02* (2013.01)

(58) Field of Classification Search
CPC ....... G09G 2340/0435; G09G 2360/18; G09G 2370/02; G09G 3/20; H04N 21/44004;
(Continued)

(56) References Cited

U.S. PATENT DOCUMENTS 9,086,995 B2    7/2015  Colenbrander
9,984,653 B1 *  5/2018  Madhvapathy ........ H04N 19/44
(Continued)

FOREIGN PATENT DOCUMENTS

CN          102761773 A       10/2012
KR      10-2013-0082883        7/2013
(Continued)

OTHER PUBLICATIONS

International Search Report, PCT/ISA/210, and Written Opinion, PCT/ISA/237, dated Jan. 12, 2023, in PCT Application No. PCT/KR2022/014851.
(Continued)

*Primary Examiner* — Behrooz M Senfi
(74) *Attorney, Agent, or Firm* — STAAS & HALSEY LLP

(57) ABSTRACT

Provided are a display apparatus and an operating method thereof. The display apparatus includes a display, a reproducer configured to reproduce content, a memory storing one or more instructions, and a processor configured to execute the one or more instructions stored in the memory to: obtain a characteristic of content requested to be reproduced; obtain, as a first latency threshold serving as a reference value for a latency control operation, a first value based on the obtained characteristic of the content; measure latency of the content during reproduction of the content by the reproducer; determine whether the measured latency of the content is greater than the first value; and based on determining that the measured latency of the content is greater than the first value, control the reproducer to drop at least some of frames corresponding to the content.

15 Claims, 10 Drawing Sheets

(58) Field of Classification Search
CPC ....... H04N 21/440281; H04N 21/4424; H04N 21/4781; H04N 21/6547; A63F 13/355; A63F 13/358; A63F 2300/534
USPC .................................................... 375/240.12
See application file for complete search history.

(56) References Cited

U.S. PATENT DOCUMENTS

| | | | |
|---|---|---|---|
| 10,171,543 | B2 | 1/2019 | Lee et al. |
| 10,255,021 | B2 | 4/2019 | Makar et al. |
| 10,681,345 | B2 | 6/2020 | Kang et al. |
| 10,957,093 | B2 | 3/2021 | Tavakoli et al. |
| 11,050,967 | B2 | 6/2021 | Yu et al. |
| 2008/0120389 | A1* | 5/2008 | Bassali ............. H04N 21/6332 709/207 |
| 2014/0096171 | A1* | 4/2014 | Shivadas .......... H04N 21/44004 725/109 |
| 2021/0144443 | A1 | 5/2021 | Joh et al. |
| 2022/0417571 | A1* | 12/2022 | Fruchter .......... H04N 21/23655 |

FOREIGN PATENT DOCUMENTS

| | | | |
|---|---|---|---|
| KR | 10-2015-0116220 | 10/2015 | |
| KR | 10-2018-0013921 | 2/2018 | |
| KR | 10-2019-0016306 | 2/2019 | |
| KR | 10-2021-0027920 | 3/2021 | |
| KR | 10-2021-0105161 | 8/2021 | |
| WO | WO-03005631 A1 * | 1/2003 | ............... H04L 1/16 |
| WO | WO 2017/210027 A1 | 12/2017 | |
| WO | WO 2021/009255 A1 | 1/2021 | |
| WO | WO 2021/013558 A1 | 1/2021 | |

OTHER PUBLICATIONS

N. Laoutaris et al.: "Intrastream Synchronization for Continuous Media Streams: A Survey of Playout Schedulers", IEEE Network, vol. 16, No. 3, May 1, 2002(May 1, 2002), pp. 30-40, xp055106863, ISSN:0890-8044, DOI:10.1109/MNET.2002.1002997 *section V.
European Search Report dated Sep. 3, 2024, in European Application No. EP 22 87 6984.

* cited by examiner

FIG. 5

| | CONTENT CATEGORY | LATENCY REDUCTION SPEED | DROP RATIO | LATENCY THRESHOLD |
|---|---|---|---|---|
| HIGH DEGREE OF LATENCY IMPACT | FPS, MMORPG | HIGH | 50% | FIRST LATENCY THRESHOLD : FIRST VALUE |
| LOW DEGREE OF LATENCY IMPACT | RPG | LOW | 10% | FIRST LATENCY THRESHOLD : SECOND VALUE | ns
DISPLAY APPARATUS AND OPERATING METHOD THEREOF

CROSS-REFERENCE TO RELATED APPLICATION

This application is a continuation application, under 35 U.S.C. § 111 (a), of international application No. PCT/KR2022/014851, filed on Sep. 30, 2022, which claims priority under 35 U. S. C. § 119 to Korean Patent Application No. 10-2021-0130286, filed on Sep. 30, 2021, the disclosures of which are incorporated herein by reference in their entirety.

BACKGROUND

Field

Various embodiments of the disclosure relate to a display apparatus and an operating method thereof, and more particularly, to a display apparatus capable of effectively reducing latency that may occur therein and an operating method thereof.

Description of Related Art

Latency may occur between a server and a client device during reproduction of content provided by a real-time bidirectional communication service. In the case of game content provided by a real-time bidirectional communication service, latency may occur in a screen of the game content displayed on a client device due to various causes such as the performance of the client device receiving the game content from the server and reproducing the game content, a control operation of the client device, etc. In order to reduce the latency, a gaming mode may be provided and frame dropping may be performed at a certain rate by the client device in the gaming mode. However, in the gaming mode, frame dropping is uniformly performed for game content at a certain rate and thus a method of flexibly reducing latency to be more suitable for content in a game environment is needed.

SUMMARY

Various embodiments of the disclosure are directed to providing a display apparatus for reproducing content by adjusting a reproduction latency adaptively according to characteristics of the content, and an operating method thereof.

Aspects of various embodiments of the disclosure will be set forth in part in the description which follows and, in part, will be apparent from the description, or may be learned by practice of the presented embodiments.

According to an embodiment of the disclosure, a display apparatus includes a display, a reproducer configured to reproduce content, a memory storing one or more instructions, and a processor configured to execute the one or more instructions stored in the memory to obtain a characteristic of content requested to be reproduced, obtain, as a first latency threshold serving as a reference value for a latency control operation, a first value based on the obtained characteristic of the content, measure a latency of the content during reproduction of the content by the reproducer, determine whether the measured latency of the content is greater than the first value, and, based on determining that the measured latency of the content is greater than the first value, control the reproducer to drop at least some of frames corresponding to the content.

According to an embodiment of the disclosure, the processor may be further configured to execute the one or more instructions to determine how much the characteristic of the content affects the latency of the content, and determine the first value as the first latency threshold according to how much the characteristic of the content is determined to affect the latency of the content.

According to an embodiment of the disclosure, the content may include game content to be executed by a real-time bidirectional communication service, and the characteristic of the content may include a category of the game content.

According to an embodiment of the disclosure, the processor may be further configured to execute the one or more instructions to determine a latency reduction speed, based on the obtained characteristic of the content, determine a frame drop ratio corresponding to the determined latency reduction speed, and control the reproducer to drop the at least some of frames according to the determined frame drop ratio, based on determining that the measured latency of the content is greater than the first value.

According to an embodiment of the disclosure, the processor may be further configured to execute the one or more instructions to obtain, as a second latency threshold serving as a reference value for a buffer flush operation, a second value based on the obtained characteristic of the content, and, based on the measured latency of the content being greater than the second value, request a source providing the content to provide frames corresponding to the content, and control the reproducer to perform the buffer flush operation so as to empty a buffer.

According to an embodiment of the disclosure, the processor may be further configured to execute the one or more instructions to, based on the measured latency of the content being greater than the second value, request the source providing the content to provide an I-frame among the frames corresponding to the content.

According to an embodiment of the disclosure, the processor may be further configured to execute the one or more instructions to control the reproducer to perform buffer flushing based on the I-frame being received from the source.

According to an embodiment of the disclosure, the reproducer may include a main buffer configured to receive and store frames corresponding to the content, a decoder configured to decode frames output from the main buffer, a display buffer configured to receive and store the decoded frames, a renderer configured to receive the stored decoded frames from the display buffer, and to render the decoded frames received from the display buffer, and a latency handler configured to manage a latency of the content.

According to an embodiment of the disclosure, the latency handler may be further configured to measure the latency of the content, based on frames stored in the main buffer and frames stored in the display buffer.

According to an embodiment of the disclosure, the display buffer may be further configured to, based on determining that the measured latency of the content is greater than the first value, drop at least some of frames stored in the display buffer at a frame drop ratio corresponding to a latency reduction speed determined based on the characteristics of the content.

According to an embodiment of the disclosure, the processor may be further configured to execute the one or more instructions to obtain, as a second latency threshold serving as a reference value for a buffer flush operation, a second value based on the obtained characteristic of the content, and the main buffer may be further configured to, based on the measured latency of the content being greater than the second value, perform the buffer flush operation to delete frames stored in the main buffer.

According to an embodiment of the disclosure, an operating method of a display apparatus includes obtaining a characteristic of content requested to be reproduced, obtaining, as a first latency threshold serving as a reference value for a latency control operation, a first value based on the obtained characteristic of the content, measuring a latency of the content during reproduction of the content, determining whether the measured latency of the content is greater than the first value, and, based on determining that the measured latency of the content is greater than the first value, controlling at least some of frames corresponding to the content to be dropped.

According to an embodiment of the disclosure, the operating method may further include obtaining a characteristic of content requested to be reproduced, obtaining, as a first latency threshold serving as a reference value for a latency control operation, a first value based on the obtained characteristic of the content, measuring latency of the content during reproduction of the content, determining whether the measured latency of the content is greater than the first value, and based on determining that the measured latency of the content is greater than the first value, controlling at least some of frames corresponding to the content to be dropped.

According to an embodiment of the disclosure, the operating method may further include determining how much the characteristic of the content affects the latency of the content, and determining, as the first latency threshold, the first value according to how much the characteristic of the content is determined to affect the latency of the content.

According to an embodiment of the disclosure, the content may include game content to be executed by a real-time bidirectional communication service, and the characteristic of the content may include a category of the game content.

According to an embodiment of the disclosure, the operating method may further include determining a latency reduction speed, based on the obtained characteristic of the content, determining a frame drop ratio corresponding to the determined latency reduction speed, and based on determining that the measured latency of the content is greater than the first value, controlling at least some of frames to be dropped according to the determined frame drop ratio.

According to an embodiment of the disclosure, the operating method may further include obtaining, as a second latency threshold serving as a reference value for a buffer flush operation, a second value based on the obtained characteristic of the content, and requesting a source providing the content to provide the frames corresponding to the content and controlling a reproducer to perform the buffer flush operation so as to empty a buffer, when the measured latency of the content is greater than the second value.

According to an embodiment of the disclosure, the operating method may further include, based on the measured latency of the content being greater than the second value, requesting the source providing the content to provide an I-frame among the frames corresponding to the content.

According to an embodiment of the disclosure, the operating method may further include controlling buffer flushing to be performed based on the I-frame being received from the source.

According to an embodiment of the disclosure, there is provided a computer-readable recording medium having recorded thereon a program including one or more instructions to implement, on a computer, an operating method of a display apparatus, wherein the operating method of the display apparatus includes obtaining a characteristic of content requested to be reproduced, obtaining, as a first latency threshold serving as a reference value for a latency control operation, a first value based on the obtained characteristic of the content, measuring a latency of the content during reproduction of the content, determining whether the measured latency of the content is greater than the first value, and, based on determining that the latency of the content is greater than the first value, controlling at least some of frames corresponding to the content to be dropped.

According to various embodiments of the disclosure, a latency of content provided by a real-time bidirectional communication service can be more accurately managed to effectively guarantee concurrency and seamless reproduction of the content to a user.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5 illustrates an example of a latency threshold set according to a category of content according to an embodiment of the disclosure.

DETAILED DESCRIPTION OF EXEMPLARY EMBODIMENTS

Figure 1:
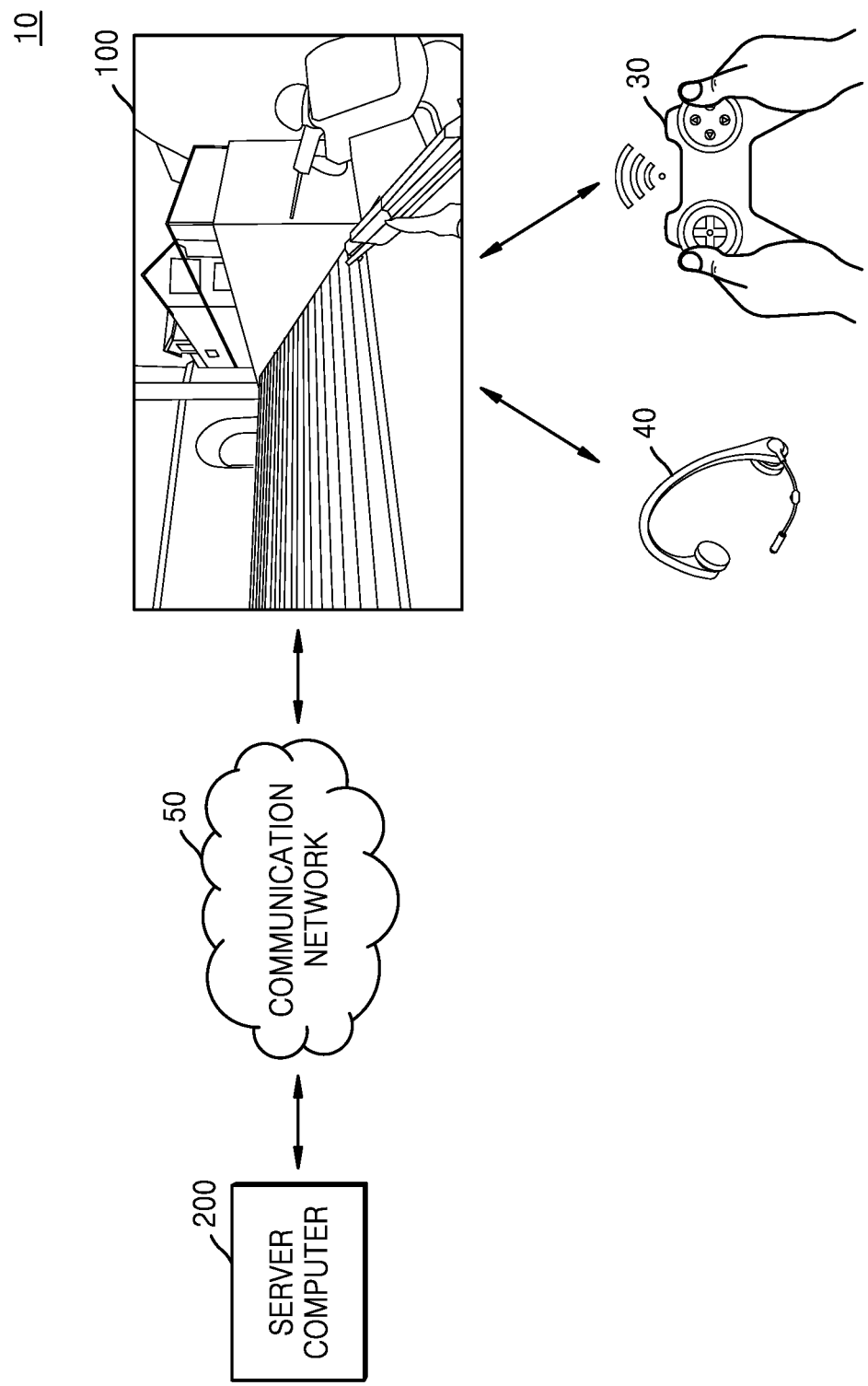
FIG. 1 is a reference diagram for describing an environment in which a method of reducing latency in a display apparatus according to an embodiment of the disclosure is applied.

Throughout the disclosure, the expression "at least one of a, b or c" indicates only a, only b, only c, both a and b, both a and c, both b and c, all of a, b, and c, or variations thereof.

The terms used in the present specification will be briefly described and then the disclosure will be described in detail.

In the disclosure, general terms that have been widely used nowadays are selected, when possible, in consideration of functions of the disclosure, but non-general terms may be selected according to the intentions of technicians in the art, precedents, or new technologies, etc. Some terms may be arbitrarily chosen by the present applicant. In this case, the meanings of these terms will be explained in corresponding parts of the disclosure in detail. Thus, the terms used herein should be defined not based on the names thereof but based on the meanings thereof and the whole context of the disclosure.

It will be understood that when an element is referred to as "including" another element, the element may further include other elements unless mentioned otherwise. Terms such as "unit", "module," and the like, when used herein, represent units for processing at least one function or operation, which may be implemented by hardware, software, or a combination of hardware and software.

Hereinafter, embodiments of the disclosure will be described in detail with reference to the accompanying drawings, so that the embodiments of the disclosure may be easily implemented by those of ordinary skill in the art. However, the disclosure may be embodied in many different forms and is not limited to the embodiments of the disclosure set forth herein. For clarity, parts not related to explaining the disclosure are omitted in the drawings, and like components are denoted by like reference numerals throughout the specification.

The term "user" used in embodiments of the description refers to a person who controls a function or operation of a computing device or an electronic device by using a control device, and may include a viewer, an administrator, or an installer.

Various embodiments of the disclosure are directed to providing a display apparatus for reproducing content by adjusting a reproduction latency adaptively according to characteristics of the content, and an operating method thereof.

According to various embodiments of the disclosure, a latency of content provided by a real-time bidirectional communication service can be more accurately managed to effectively guarantee concurrency and seamless reproduction of the content to a user.

FIG. 1 is a reference diagram for describing an environment in which a method of reducing a latency in a display apparatus 100, according to an embodiment of the disclosure.

Referring to FIG. 1, an environment 10 may include the display apparatus 100, a communication network 50, and a server computer 200.

The server computer 200 may be connected to the display apparatus 100 through the communication network 50.

The server computer 200 is an entity capable of providing various types of content and thus may provide content to the display apparatus 100 through the communication network 50 upon receiving a request to provide the content from the display apparatus 100. The various types of content may include, for example, video content, audio content, real-time bidirectional communication service content, and the like. The real-time bidirectional communication service content may refer to content provided through a real-time bidirectional communication service, because the server computer 200 receives control data, which is controlled by a user of the display apparatus 100, and performs an operation corresponding to the control data while providing the real-time bidirectional communication service content to the display apparatus 100. The real-time bidirectional communication service content may include, for example, game content.

The display apparatus 100 is an entity capable of displaying various types of content, and may request the server computer 200 to provide content and display the content when receiving the content from the server communication 200 through the communication network 50. For example, when the display apparatus 100 receives game content from the server computer 200 and display the content, the user of the display apparatus 100 may control the game content displayed on the display apparatus 100. The game content may include video content and audio content. The display apparatus 100 may display the video content included in the game content on a display of the display apparatus 100. The display apparatus 100 may output the audio content included in the game content through a speaker included in the display apparatus 100 or an audio output device, e.g., a headset 40, connected to the display apparatus 100. The user of the display apparatus 100 may play a game by controlling the game content while viewing the game content displayed on the display of the display apparatus 100. The user may control the game content by using various types of controllers. For example, the user of the display apparatus 100 may control the game content using the display apparatus 100 and the communication connected game controller 30.

The display apparatus 100 may be an apparatus that includes a display and thus is capable of displaying image content, video content, game content, graphics content, and the like. Examples of the display apparatus 100 may include various types of electronic devices, such as a network TV, a smart TV, an Internet TV, a web TV, a IPTV, a personal computer (PC), etc., which are capable of receiving and outputting content. The display apparatus 100 may be referred to as a display apparatus in terms of receiving and displaying content but may be referred to as a content receiving device, a sink device, an electronic device, a computing device, or the like.

The display apparatus 100 may display various types of real-time bidirectional communication service content. The real-time bidirectional communication service content may include, for example, game content.

The display apparatus 100 may reproduce content upon receiving a request to reproduce the content from a user. When the content requested to be reproduced is content to be displayed by a real-time bidirectional communication service with a server computer, latency of the content may occur during reproduction of the content. The latency may refer to a delay occurring due to the difference between a speed of transmitting the content to the display apparatus 100 from the server computer 200 and a speed of processing the content, which is received from the server computer 200, by the display apparatus 100. The latency may occur due to a difference in a network environment or the performance of the display apparatus 100, e.g., a decoding speed of the display apparatus 100. Thus, the display apparatus 100 needs to reduce the latency to provide content in an optimal environment. However, because an impact of the latency may vary according to characteristic of content, the display apparatus 100 according to embodiments of the disclosure set forth herein provides a method of handling a latency adaptively according to the characteristic of the content.

For example, game content provided through a real-time bidirectional communication service may be classified into categories according to a degree of latency impact. For example, a role-playing game (RPG) refers to a game that users enjoy while taking on the role of a character in the game. MMORPG stands for a massive multiplayer online role-playing game and is a type of RPG in which a user takes on a role of a character in the game and multiple players connected online can enjoy the game together in the same space. Although the MMORPG is a type of RPG, it may be important to minimize a latency because concurrency with other uses is important. A first-person shooter (FPS) is a shooting game in which a battle is played using a weapon or tool on a screen viewed from a player's viewpoint, i.e., a viewpoint from which a user views things, and thus is very realistic compared to other types of games because a character's viewpoint in the game should be the same as the player's viewpoint. In a shooting game, shooting is accurately implemented when a character's viewpoint in the game and a player's viewpoint are the same and thus it may be important to minimize a latency even when a discontinuity occurs. On the other hand, in the case of an RPG, seamless reproduction may be more important than reducing latency. Thus, the RPG may belong to a category of low latency impact, and a game such as an FPS or an MMORPG may belong to a category of high latency impact.

According to an embodiment of the disclosure, the display apparatus 100 may classify a type of content according to various criteria. For example, the display apparatus 100 may classify content, based on a degree of latency impact. The degree of latency impact may be understood to mean the degree of latency impact on the content. For example, a shooting game such as gun shooting among various types of game content may be classified as content with a high latency impact, because a gun shooting operation will become meaningless when a point in time when a gun is shot is missed and thus latency is significant even when discontinuity occurs occasionally. For example, a pioneering game that is played alone may be classified as content with a low latency impact, because continuous reproduction is more important than latency. As described above, in the case of game content, there may be a game for which latency is more significant and a game for which latency is less significant according to a characteristic of the game content.

Thus, the display apparatus 100 described herein does not handle a latency uniformly. Instead, the display apparatus 100 handles the latency according to the characteristic of the game content so as to optimize reproduction of the game content for the game content. Specifically, the display apparatus 100 may handle a latency to be more strictly managed when game content with a high latency impact is reproduced, and handle the latency to be less strictly managed when game content with a low latency impact is reproduced.

According to an embodiment of the disclosure, the display apparatus 100 may decide a category of content, based on a characteristic of the content to be reproduced. The number of categories into which the content belongs to by the display apparatus 100 may be variously determined, for example, to be two, three, four or the like, based on the characteristic of the content to be reproduced. A characteristic of content based on which a category of the content is to be divided into sub-categories by the display apparatus 100 may be determined variously. For example, the display apparatus 100 may divide a category of content into sub-categories, based on a degree of latency impact on the content, that is, how much the characteristic of the content affects the latency of the content.

According to an embodiment of the disclosure, the display apparatus 100 may set a first latency threshold serving as a reference value for a latency control operation, based on a characteristic of content to be reproduced. The display apparatus 100 may more accurately handle the latency by differently setting a threshold serving as a reference value for the latency control operation, based on a characteristic of content. For example, when the display apparatus 100 divides a category of content into two sub-categories, based on a characteristic of the content to be reproduced, the display apparatus 100 may set the first latency threshold to a first value when the content belongs to a first category and set the first latency threshold to a second value when the content belongs to a second category. For example, when the content to be reproduced belongs to a first category corresponding to an FPS or an MMORPG with a high latency impact, the display apparatus 100 may set the first latency threshold to the first value which is relatively small value. For example, when the content to be reproduced belongs to a second category corresponding to an RPG with a low latency impact, the display apparatus 100 may set the first latency threshold to the second value which is relatively large value. Due to the above configuration, the latency control operation may be set to start even when a latency slightly increases during playing of a game such as the FPS and to start when a latency of content is relatively long during playing of a game such as the RPG.

According to an embodiment of the disclosure, the display apparatus 100 may drop frames corresponding to content when a latency of the content that is being reproduced is greater than the first latency threshold set therefor. In this case, the display apparatus 100 may drop the frames at a frame drop ratio determined according to a latency reduction speed determined based on a characteristic of the content, when the latency of the content is greater than the first latency threshold.

According to an embodiment of the disclosure, the display apparatus 100 may determine whether the latency of the content is greater than a second latency threshold, as well as determining whether the latency of the content is greater than the first latency threshold. The second latency threshold may be a reference value for performing the buffer flush operation when the latency of the content is not reduced by a frame drop operation. The second latency threshold may also be determined differently according to the characteristic of the content. When it is determined that the latency of the content is greater than the second latency threshold, the display apparatus 100 may perform the buffer flush operation to delete frames stored in a buffer. To perform the buffer flush operation, the display apparatus 100 may request a source providing the content to provide frames corresponding to the content and perform the buffer flush operation to empty the buffer upon receiving the frames. In this case, the display apparatus may request the source providing the content to provide an I-frame corresponding to the content. This is because buffer flushing is to be performed and thus the I-frame, which is a key frame based on which video processing is performed, should be first received to perform a decoding operation by the display apparatus 100.

Figure 2:
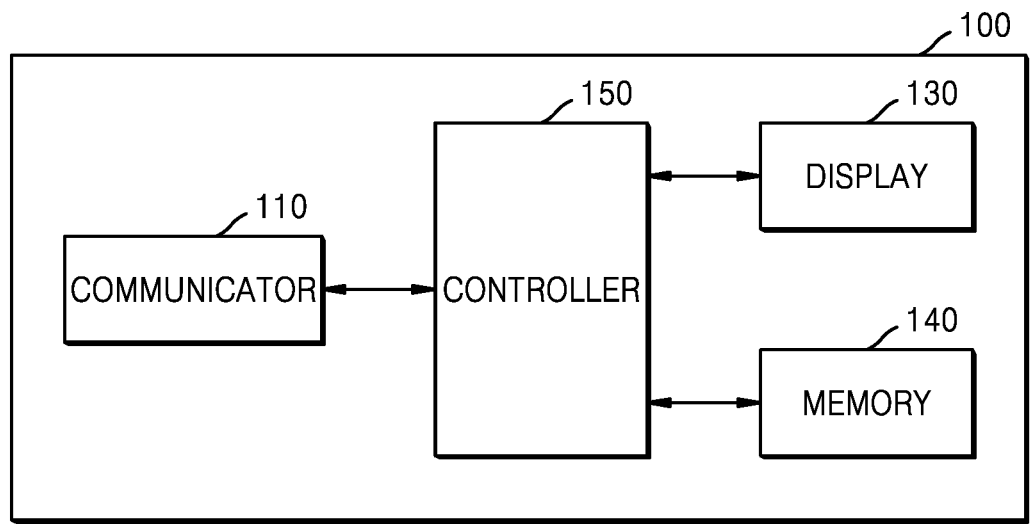
FIG. 2 is an example of a block diagram of a display apparatus according to an embodiment of the disclosure.

FIG. 2 is an example of a block diagram of a display apparatus according to an embodiment of the disclosure.

Referring to FIG. 2, a display apparatus 100 may include a communicator 110, a display 130, a memory 140, and a controller 150.

The communicator 110 may receive content from the server computer 200 according to a communication protocol under control of the controller 150.

The display 130 may display the content received from the server computer 200 on a screen.

The memory 140 may store a program related to an operation of the display apparatus 100 and various types of data generated during the operation of the display apparatus 100.

The control unit 150 may control overall operations of the display apparatus 100, process the content received from the server computer 200, and control the display 130 to display the processed content.

According to an embodiment of the disclosure, the controller 150 may execute one or more instructions to obtain a characteristic of content requested to be reproduced, obtain a first value as a first latency threshold serving as a reference value for the latency control operation, according to the characteristic of the content, measure a latency of the content during reproduction of the content, determine whether the latency of the content is greater than the first value determined to correspond to the characteristic of the content, and control at least some of frames corresponding to the content to be dropped when the latency of the content is greater than the first value.

According to an embodiment of the disclosure, the controller 150 may execute one or more instructions to determine a degree of latency impact according to the characteristic of the content and determine the first value as the first latency threshold according to the degree of latency impact.

According to an embodiment of the disclosure, the content includes game content to be performed by a real-time bidirectional communication service, and the characteristic of the content include a category of the game content.

According to an embodiment of the disclosure, the controller 150 may execute one or more instructions to determine a latency reduction speed, based on the characteristic of the content, determine a frame drop ratio corresponding to the latency reduction speed, and control the frames to be dropped when the latency of the content is greater than the first value.

According to an embodiment of the disclosure, the controller 150 may execute one or more instructions to obtain a second value as a second latency threshold serving as a reference value for the buffer flush operation, according to the characteristic of the content, and request a source providing the content to provide frames corresponding to the content and control the buffer flush operation to be performed to empty the buffer, when the latency of the content is greater than the second value.

According to an embodiment of the disclosure, the controller 150 may execute one or more instructions to request a source providing the content to provide an I-frame among the frames corresponding to the content when the latency of the content is greater than the second value.

According to an embodiment of the disclosure, the controller 150 may execute one or more instructions to control the buffer flush operation to be performed upon receiving the I-frame from the source.

Figure 3:
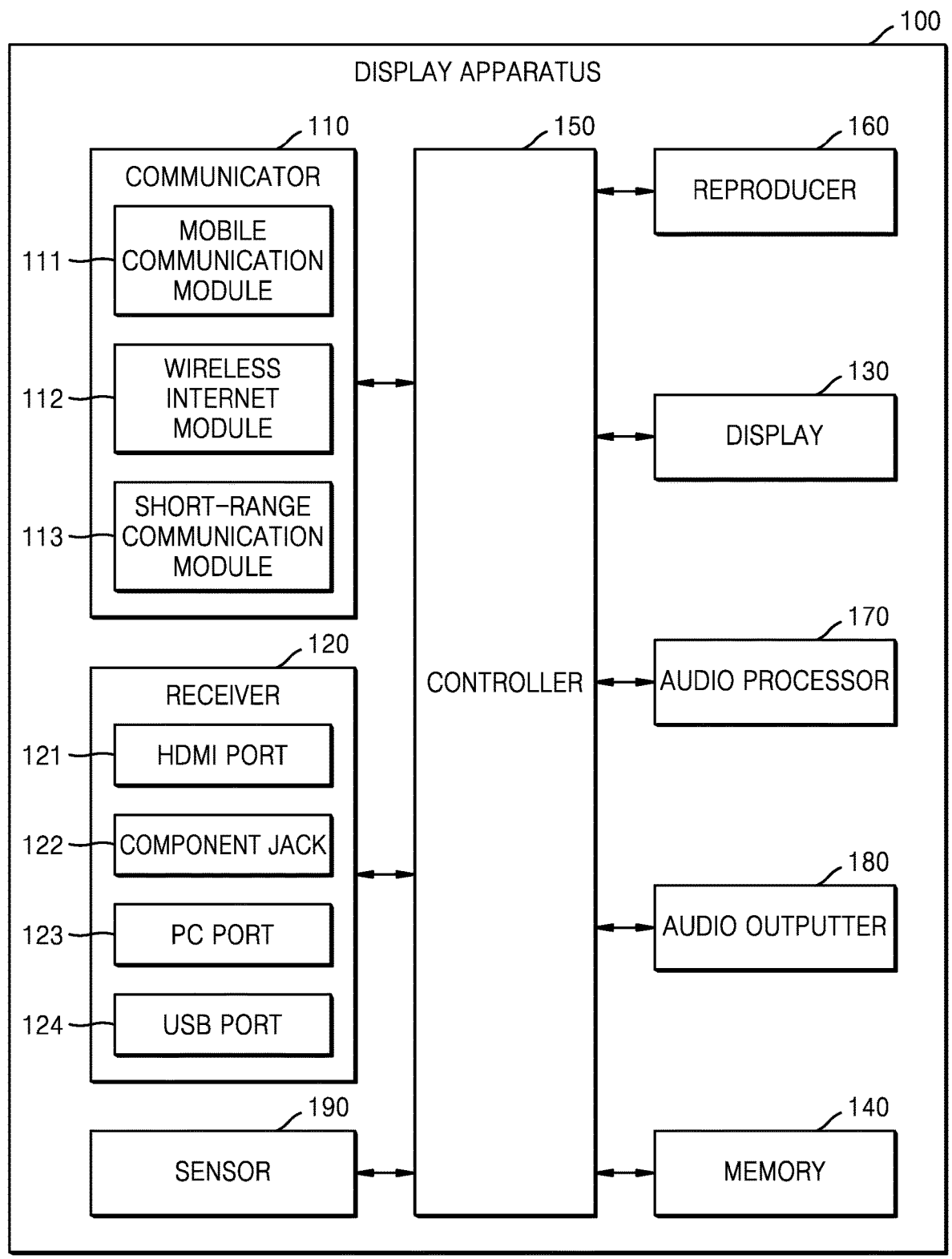
FIG. 3 is a detailed block diagram of a display apparatus according to an embodiment of the disclosure.

FIG. 3 is a detailed block diagram of a display apparatus 100 according to an embodiment of the disclosure.

Referring to FIG. 3, the display apparatus 100 may include a reproducer 160, an audio processor 170, an audio outputter 180, and a sensor 190, as well as a communicator 110, a receiver 120, a display 130, a memory 140, and a controller 150.

The communicator 110 may include one or more modules for wireless communication between the display apparatus 100 and a wireless communication system or between the display apparatus 100 and a network in which another electronic device is located. For example, the communicator 110 may include a mobile communication module 111, a wireless Internet module 112 and a short-range communication module 113.

The mobile communication module 111 transmits a radio signal to or receives a radio signal from at least one of a base station, an external terminal, or a server in a mobile communication network. Here, the radio signal may include a voice call signal, a video call signal, or various types of data transmitted or received through a text/multimedia message.

The wireless Internet module 112 is module for wireless Internet access and may be provided inside or outside a device. A wireless local area network (WLAN), WiFi, wireless broadband (Wibro), world interoperability for microwave access (Wimax), high-speed downlink packet access (HSDPA) or the like may be used as wireless Internet technology. Through the wireless Internet module 113, the device may be connected to another device through Wi-Fi or peer-to-peer (P2P) connection.

The short-range communication module 113 is a module for short range communication. Bluetooth, Bluetooth low energy (BLE), radio-frequency identification (RFID), infrared data association (IrDA), ultra-wideband (UWB), ZigBee, or the like may be used as short-range communication technology.

According to an embodiment of the disclosure, the communicator 110 may request the server computer 200 to transmit content requested to be reproduced and receive the content from the server computer 200, under control of the controller 150.

The receiver 120 may receive a video (e.g., a moving picture), an audio signal (e.g., voice or music), additional information (e.g., an electronic program guide (EPG)) or the like from the outside of the display apparatus 100, under control of the controller 150. The receiver 120 may include a high-definition multimedia interface (HDMI) port 121, a component jack 122, a PC port 123, a USB port 124, or a combination thereof. The receiver 120 may further include a display port (DP), a thunderbolt, and a mobile high-definition link (MHL), in addition to the HDMI port 121.

The reproducer 160 may process an image signal received from the receiver 120 or the communicator 110 and output a result of processing the image signal to the display 130, under control of the controller 150.

According to an embodiment of the disclosure, the reproducer 160 may include a main buffer for receiving frames corresponding to content, a decoder for decoding the frames output from the main buffer, a display buffer for receiving the decoded frames, a renderer, and a latency handler for managing a latency of the content.

According to an embodiment of the disclosure, the latency handler may determine the latency of the content, based on frames stored in the main buffer and frames stored in the display buffer.

According to an embodiment of the disclosure, the display buffer may drop at least some of the frames stored in the display buffer at a frame drop ratio corresponding to a latency reduction speed determined based on a characteristic of the content, when the latency of the content is greater than the first latency threshold.

According to an embodiment of the disclosure, the main buffer may perform buffer flushing to delete the frames stored in the main buffer when the latency of the content is greater than the second latency threshold.

The display 130 may display an image signal received from the image processor 160 on a screen.

The audio processor 170 may convert an audio signal received from the receiver 120 or the communicator 110 into an analog audio signal and output the analog audio signal to the audio outputter 180, under control of the controller 150.

The audio outputter 180 may output the received analog audio signal through a speaker.

The memory 140 may store a program related to an operation of the display apparatus 100 and various types of data generated during the operation of the display apparatus 100.

According to an embodiment of the disclosure, the memory 140 may store one or more instructions to perform a latency management operation during reproduction of content.

According to an embodiment of the disclosure, the controller 150 may execute one or more instructions to obtain a characteristic of content requested to be reproduced, obtain a first value as a first latency threshold serving as a reference value for a latency control operation, according to the characteristic of the content, measure a latency of the content during reproduction of the content, determine whether the latency of the content is greater than the first value determined to correspond to the characteristic of the content, and control the reproducer 160 to drop at least some of the frames corresponding to the content when the latency of the content is greater than the first value.

According to an embodiment of the disclosure, the controller 150 may execute one or more instructions to determine a degree of latency impact according to the characteristic of the content and determine the first value as the first latency threshold according to the degree of latency impact.

According to an embodiment of the disclosure, the content includes game content to be performed by a real-time bidirectional communication service, and the characteristic of the content include a category of the game content.

According to an embodiment of the disclosure, the controller 150 may execute one or more instructions to determine a latency reduction speed, based on the characteristic of the content, and determine a frame drop ratio corresponding to the latency reduction speed and control the reproducer 160 to drop frames at the frame drop ratio, when the latency of the content is greater than the first value.

According to an embodiment of the disclosure, the controller 150 may execute one or more instructions to obtain a second value as a second latency threshold serving as a reference value for the buffer flush operation, according to the characteristic of the content, and request a source providing the content to provide frames corresponding to the content and control the reproducer 160 to perform the buffer flush operation to empty the buffer, when the latency of the content is greater than the second value.

According to an embodiment of the disclosure, the controller 150 may execute one or more instructions to request the source providing the content to provide an I-frame among the frames corresponding to the content when the latency of the content is greater than the second value.

According to an embodiment of the disclosure, the controller 150 may execute one or more instructions to control the reproducer 160 to perform the buffer flush operation upon receiving the I-frame from the source.

Figure 4:
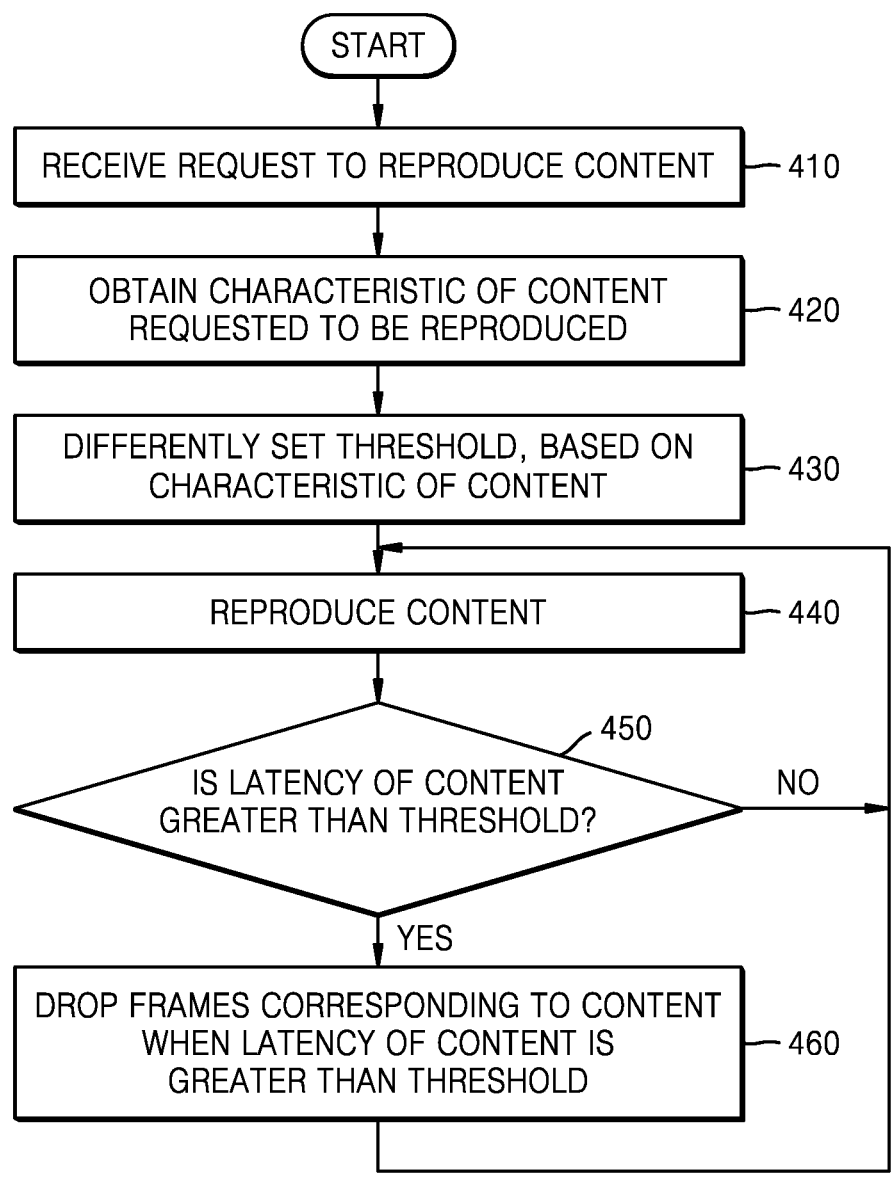
FIG. 4 is a flowchart of an example of an operating method of a display apparatus according to an embodiment of the disclosure.

FIG. 4 is a flowchart of an example of an operating method of a display apparatus according to an embodiment of the disclosure.

Referring to FIG. 4, in operation 410, the display apparatus 100 may receive a request to reproduce content. The content may include content serviced by real-time bidirectional communication. The content serviced by real-time bidirectional communication may include, for example, game content.

For example, the display apparatus 100 may receive the request to reproduce the content by displaying a graphic user interface for displaying one or more content items provided from a server computer on a display and receiving a user input to select one content item through the graphic user interface.

In operation 420, the display apparatus 100 may obtain a characteristic of the content requested to be reproduced.

According to an embodiment of the disclosure, the display apparatus 100 may obtain characteristic information of the content by requesting the server computer providing the content to provide metadata of the content requested to be reproduced and receiving the metadata of the content from the server computer. The metadata of the content may include characteristic information such as a type or category of the content. Thus, the display apparatus 100 may obtain the characteristic information of the content from the metadata of the content.

According to an embodiment of the disclosure, the display apparatus 100 may obtain the metadata of the content requested to be reproduced from a memory of the display apparatus 100. The display apparatus 100 may store metadata of content corresponding to a content item, which is provided through the graphic user interface, in advance. Thus, in this case, the display apparatus 100 may read the metadata of the content stored in the memory to obtain characteristic information of the content.

According to an embodiment of the disclosure, the display apparatus 100 may obtain the metadata of the content requested to be reproduced from an external server by using fingerprint technology. The external server may be either a server computer that provides the content or a fingerprint-dedicated server separated from the server that provides the content. For example, when the display apparatus 100 transmits information obtained by analyzing some frames of the content requested to be reproduced to a fingerprint providing server, the fingerprint providing server may identify the content and provide information about the content to the display apparatus 100, based on the transmitted information. The display apparatus 100 obtain the characteristic information of the content, based on the information about the content.

Content requested by a user to be reproduced may include content provided by the real-time bidirectional communication service. The content provided by the real-time bidirectional communication service may be content, e.g., game content, which is serviced through bidirectional communication, in which when the content is provided by a server, a user transmits a signal for control of the content to the server and the server provides the user with resultant content obtained by controlling the content according to the signal. A representative example of the content provided through real-time bidirectional communication service is game content but embodiments of the disclosure are not limited thereto. For example, in the case of movie content, a user may control a certain scenario and be provided with resultant content that varies according to a result of controlling the scenario. The movie content completed through an interaction may be content provided by the real-time bidirectional communication service.

In operation 430, the display apparatus 100 may differently set a latency threshold, based on the characteristic of the content. For example, the display apparatus 100 may set a latency threshold to a first value or a second value, based on the characteristic of the content. The latency threshold may be a threshold serving as a reference value for controlling a latency. In other words, the latency threshold may be a reference value for determining whether latency of the content has reached a certain level and thus frame dropping may be performed.

A degree of latency impact may be significant in the case of content provided by the real-time bidirectional communication service. Thus, the display apparatus 100 may differently set a threshold, which is a reference value for control of a latency, according to the characteristic of content requested to be reproduced. A degree of latency impact of content may be high or low according to a characteristic of the content.

For example, game content provided through a real-time bidirectional communication service may be classified into categories according to a degree of latency impact. For example, a role-playing game (RPG) refers to a game in which a user will enjoy the game while taking on a role of a character in the game. MMORPG stands for a massive multiplayer online role-playing game and is a type of RPG in which a user takes on a role of a character in the game and multiple players connected online can enjoy the game together in the same space. Although the MMORPG is a type of RPG, it may be important to minimize a latency because concurrency with other uses is important. A first-person shooter (FPS) is a shooting game in which a battle is played using a weapon or tool on a screen viewed from a player's viewpoint, i.e., a viewpoint at which a user views things, and thus is very realistic compared to other types of games because a character's viewpoint in the game should be the same as the player's viewpoint. In a shooting game, shooting is accurately implemented when a character's viewpoint in the game and a player's viewpoint are the same and thus it may be important to minimize a latency even when a discontinuity occurs. On the other hand, in the case of an RPG, seamless reproduction may be more important than reducing a latency. Thus, the RPG may belong to a category with a low latency impact, and a game such as the FPS or the MMORPG may belong to a category with a high latency impact.

According to an embodiment of the disclosure, the display apparatus 100 may classify a category of the content according to the degree of latency impact, based on the characteristic of the content requested to be reproduced, and variously determine a threshold, which is a reference value for control of a latency, according to the category of the content.

FIG. 5 illustrates a latency threshold set according to a category of content according to an embodiment of the disclosure.

Referring to FIG. 5, for example, content categories may include an RPG, an MMORPG, an FPS, etc. The display apparatus 100 may classify a category of content according to whether a degree of latency impact is high or low. For example, a category of the FPS or MMORPG may be classified as a category with a high latency impact, and a category of the RPG may be classified as a category with a low latency impact. In the case of content with a high latency impact, a latency threshold may be set to be low, e.g., a first value, because a latency of the content should be strictly managed. That is, the latency threshold may be set to be low, e.g., the first value, so that the frame drop operation may be performed even when the latency increases slightly. On the other hand, in the case of content with a low latency impact, a latency threshold may be set to be relatively high because a latency of the content may be less strictly managed. That is, the latency threshold may be set to be relatively high, e.g., a second value greater than the first value, so that the frame drop operation may be performed only after a latency increases to a certain level. According to the above settings, frame dropping may start when a latency of content reaches the first value in the case of a game such as the FPS or MMORPG and may start when the latency of the content reaches the second value greater than the first value in the case of a game such as the RPG.

In FIG. 5, the number of categories of content is two and a latency threshold for each of the categories is determined, but this is only an example. The display apparatus 100 may determine the predetermined number of sub-categories, based on the characteristic of the content, and may set a latency threshold for each of the categories, to set a predetermined number of latency thresholds. For example, when the number of content categories is set to four, the display apparatus 100 may set a latency threshold for each of the content categories.

In operation 440, the display apparatus 100 may use the reproducer 160 to reproduce the content requested to be reproduced. Specifically, the display apparatus 100 may request a server computer to provide the content requested to be reproduced, receive frames corresponding to the content from the server computer, and decode and reproduce the frames.

In operation 450, the display apparatus 100 may determine whether a latency of the content is greater than the threshold. When the display apparatus 100 requests the server computer to provide the content requested to be reproduced, the server computer may transmit the frames of the content to the display apparatus 100. The display apparatus 100 may decode and reproduce the frames of the content received from the server computer. In this case, the display apparatus 100 may periodically measure and monitor a latency to manage a latency of the frames to be reproduced. The latency may indicate a degree of delay occurring when the display apparatus 100 process and display the received frames. The latency may be set to the number of delayed frames or a delayed time, e.g., a few msec.

Specifically, the display apparatus 100 may determine whether a latency of content that is being reproduced is greater than a set threshold. In operation 430, a latency threshold of the content may be set differently according to the characteristic of the content. For example, a latency threshold of content belonging to a first category may be set to a first value, and a latency threshold of content belonging to a second category may be set to a second value. Thus, the display apparatus 100 may determine whether the latency of the content is greater than the first value when the content that is being reproduced belongs to the first category. The display apparatus 100 may determine whether the latency of the content is greater than the second value when the content that is being reproduced belongs to the second category.

The display apparatus 100 may continuously monitor the latency of the content when it is determined that the latency of the content is not greater than the threshold set for the content in operation 430 during monitoring of the latency of the content. The display apparatus 100 may proceed to operation 460 when it is determined that the latency of the content is greater than the threshold set for the content in operation 430 during monitoring of the latency of the content.

In operation 460, when it is determined that the latency of the content is greater than the threshold set for the content, the display apparatus 100 may perform frame dropping at a latency reduction speed set for the content.

According to an embodiment of the disclosure, the display apparatus 100 may set the latency reduction speed, based on the characteristic of the content requested to be reproduced. Specifically, the display apparatus 100 may set the latency reduction speed according to a category of the content requested to be reproduced. The display apparatus 100 may classify the category of the content according to a degree of latency impact. For example, referring to FIG. 5, the latency reduction speed may be set to be "high" in the case of a game such as the FPS or MMORPG having a category with a high latency impact and be set to be "low" in the case of a game such as the RPG having a category with a low latency impact. The display apparatus 100 may determine a frame drop ratio corresponding to each latency reduction speed. For example, a frame drop ratio corresponding to a category with a "high" latency reduction speed may be set to 50% of a delayed frame (one frame drop per two frames), and a frame drop ratio corresponding to a category with a "low" latency reduction speed may be set to 10% of a delayed frame (one frame drop per ten frames). The frame drop ratio may be variously determined according to a system policy. As described above, the frame drop ratio may be set as a percentage, e.g., a certain number of frame drops per a certain number of frames.

The display apparatus 100 may perform the frame drop operation at the frame drop ratio determined based on the characteristic of the content requested to be reproduced, when the latency of the content that is being reproduced is greater than the threshold set for the content. The frame drop operation may be understood as discarding some of frames stored in a buffer of a reproducer of the display apparatus 100 without rendering the frames. As described above, content may be continuously reproduced and a latency of the content may be continuously monitored while performing frame dropping. In this case, when frame dropping is performed for a sufficient time and thus it is determined in operation 450 that the latency of the content is not greater than the threshold, operation 440 may be performed to stop frame dropping.

Figure 6:
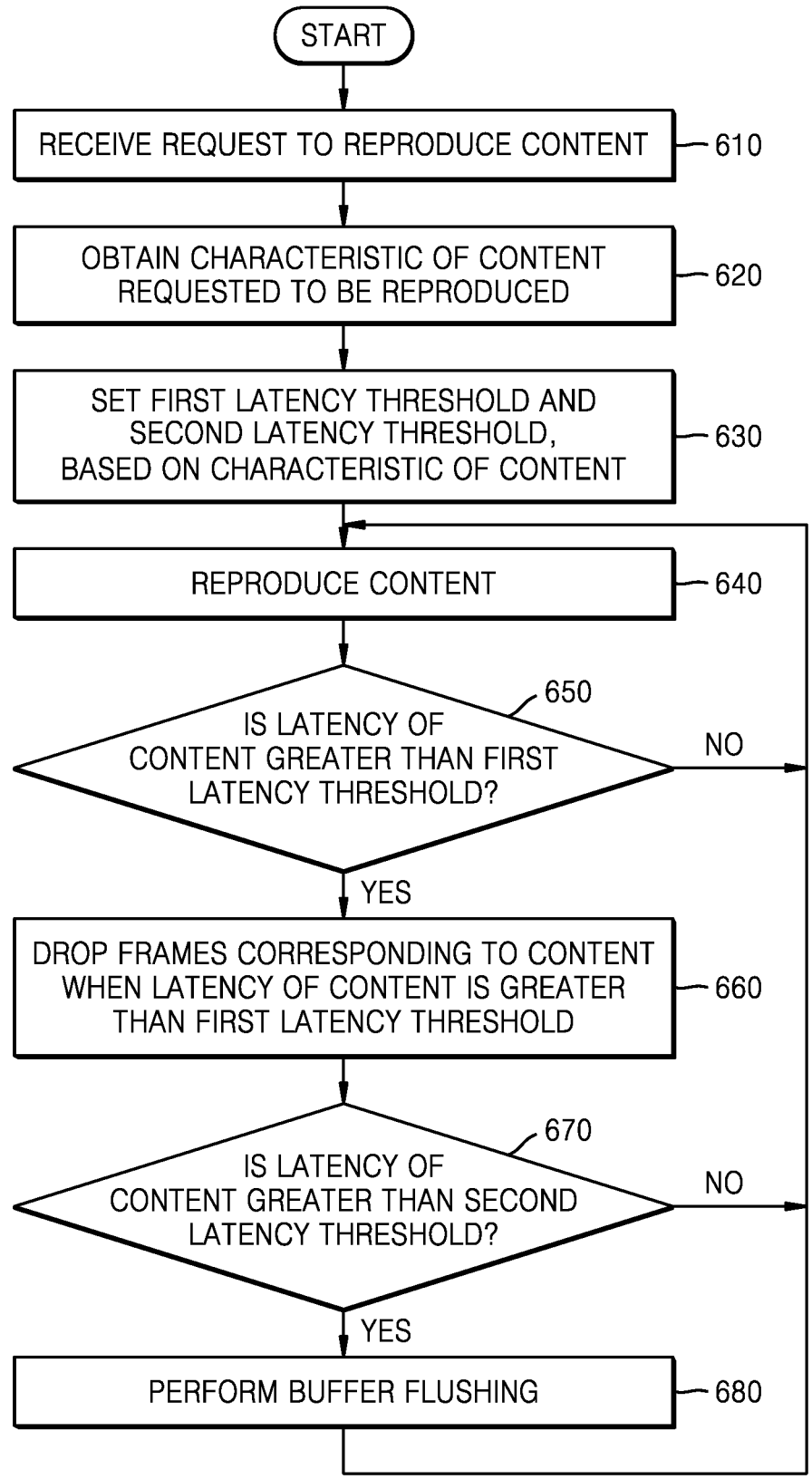
FIG. 6 is a flowchart of another example of an operating method of a display apparatus according to an embodiment of the disclosure.

FIG. 6 is a flowchart of an example of an operating method of a display apparatus according to an embodiment of the disclosure. In the operations shown in FIG. 4, only the first latency threshold is used as the latency threshold but in operations shown in FIG. 6, two latency thresholds, i.e., a first latency threshold and a second latency threshold, are used.

Referring to FIG. 6, operations 610 and 620 are the same as operations 410 and 420 shown in FIG. 4.

In operation 630, the display apparatus 100 may classify a category of content according to a degree of latency impact, based on characteristic of the content requested to be reproduced, and determine the first latency threshold and the second latency threshold, which are reference values for control of a latency, according to the category of the content. The first latency threshold may be a latency serving as a reference value for the display apparatus 100 to start the latency reduction operation. The second latency threshold may be a latency serving as a reference value for performing buffer flushing when a latency of the content does not reduce, even when the latency of the content is greater than the first latency threshold and thus the display apparatus 100 starts the latency reduction operation to perform frame dropping. When it is determined that the latency is difficult to be maintained at a desired level through the frame drop operation, the display apparatus 100 may perform the buffer flush operation to delete all of frames stored in a buffer, receive new fames from a server computer, and process the new frames.

Figure 7:
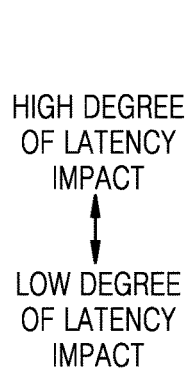
FIG. 7 illustrates another example of a latency threshold set according to a category of content according to an embodiment of the disclosure.

FIG. 7 illustrates a latency threshold set according to a category of content according to an embodiment of the disclosure.

Referring to FIG. 7, for example, content categories may include an RPG, an MMORPG, an FPS, etc. The display apparatus 100 may classify a category of content according to whether a degree of latency impact is high or low. For example, a category of the FPS or MMORPG may be classified as a category with a high latency impact, and a category of the RPG may be classified as a category with a low latency impact. In the case of content with a high latency impact, a first latency threshold may be set to be low because a latency of the content should be strictly managed. That is, the first latency threshold may be set to be low so that the frame drop operation may be performed even when the latency increases slightly. On the other hand, in the case of content with a low latency impact, the first latency threshold may be set to be relatively high because a latency of the content may be less strictly managed. That is, the first latency threshold may be set to be relatively high so that the frame drop operation may be performed only after a latency increases to a certain level. A second latency threshold may serve as a reference value for performing buffer flushing in a state in which a latency is greater than the first latency threshold and thus be set to be greater than the first latency threshold. Referring to FIG. 7, a first value set as a first latency threshold of content such as the FPS or MMORPG may be set to be lower than a second value set as a first latency threshold of content such as the RPG.

Similar to the first latency threshold, a second latency threshold may be different set according to a characteristic of content. For example, in the case of content with a high latency impact, the second latency threshold may be set to be low because a latency of the content should be strictly managed. On the other hand, in the case of content with a low latency impact, the second latency threshold may be set to be relatively high because a latency of the content may be less strictly managed. Referring to FIG. 7, a third value set as a second latency threshold of content such as the FPS or MMORPG may be set to be lower than a fourth value set as a second latency threshold of content such as the RPG.

In operation 640, the display apparatus 100 may reproduce the content requested to be reproduced. Specifically, the display apparatus 100 may request a server computer to provide the content requested to be reproduced, receive frames corresponding to the content from the server computer, and decode and reproduce the frames.

In operation 650, the display apparatus 100 may determine whether a latency of the content is greater than the first latency threshold. The display apparatus 100 may periodically measure and monitor the latency of the content to manage the latency of the content while decoding and reproducing frames to be reproduced. The latency may indicate a degree of delay occurring when the display apparatus 100 process and display the received frames.

Specifically, the display apparatus 100 may determine whether a latency of the content that is being reproduced is greater than the set first latency threshold. In operation 630, the first latency threshold of the content may be set differently according to the characteristic of the content. For example, a first latency threshold of content belonging to a first category may be set to a first value, and a second latency threshold of content belonging to a second category may be set to a second value. Thus, the display apparatus 100 may determine whether the latency of the content is greater than the first value when the content that is being reproduced belongs to the first category. The display apparatus 100 may determine whether the latency of the content is greater than the second value when the content that is being reproduced belongs to the second category.

The display apparatus 100 may continuously monitor the latency of the content when it is determined that the latency of the content is not greater than the first latency threshold set for the content in operation 630 during monitoring of the latency of the content. The display apparatus 100 may proceed to operation 660 when it is determined that the latency of the content is greater than the first threshold set for the content in operation 630 during monitoring of the latency of the content.

In operation 660, when it is determined that the latency of the content is greater than the first latency threshold set for the content, the display apparatus 100 may perform frame dropping at a latency reduction speed set for the content.

According to an embodiment of the disclosure, the display apparatus 100 may set the latency reduction speed, based on the characteristic of the content requested to be reproduced. Specifically, the display apparatus 100 may set the latency reduction speed according to a category of the content requested to be reproduced. The display apparatus 100 may classify the category of the content according to a degree of latency impact. For example, referring to FIG. 7, the latency reduction speed may be set to be "high" in the case of a game such as the FPS or MMORPG having a category with a high latency impact and be set to be "low" in the case of a game such as the RPG having a category with a low latency impact. The display apparatus 100 may determine a frame drop ratio corresponding to each latency reduction speed. For example, a frame drop ratio corresponding to a category with a "high" latency reduction speed may be set to 50% of a delayed frame (one frame drop per two frames), and a frame drop ratio corresponding to a category with a "low" latency reduction speed may be set to 10% of a delayed frame (one frame drop per ten frames).

The display apparatus 100 may perform the frame drop operation at the frame drop ratio determined based on the characteristic of the content requested to be reproduced, when the latency of the content that is being reproduced is greater than the first latency threshold set for the content. The frame drop operation may be understood as discarding some of frames stored in a buffer of a reproducer of the display apparatus 100 without rendering the frames. As described above, content may be continuously reproduced and a latency of the content may be continuously monitored while performing frame dropping. In this case, when frame dropping is performed for a sufficient time and thus it is determined in operation 650 that the latency of the content is not greater than the first latency threshold, operation 640 may be performed to stop frame dropping.

In operation 660, the display apparatus 100 may drop frames corresponding to the content when the latency of the content is greater than the first latency threshold.

The display apparatus 100 may perform the frame drop operation at a frame drop ratio determined based on the characteristic of the content requested to be reproduced, when the latency is greater than the first latency threshold. The frame drop operation may be understood as discarding some of frames stored in a buffer of a reproducer of the display apparatus 100 without rendering the frames.

In operation 670, the display apparatus 100 may determine whether the latency of the content is greater than the second latency threshold.

When the latency of the content is greater than the first latency threshold, the display apparatus 100 may determine whether the latency of the content is greater than the second latency threshold during performance of frame dropping while continuously monitoring the latency of the content. When the latency of the content is not greater than the second latency threshold, the display apparatus 100 may monitor the latency of the content while continuously performing frame dropping. When the latency of the content is greater than the second latency threshold, the display apparatus 100 may determine that the latency cannot be maintained at a desired level through the frame drop operation and thus buffer flushing should be performed. Thus, when the latency of the content is greater than the second latency content, the display apparatus 100 may proceed to operation 680 to perform buffer flushing.

In operation 680, the display apparatus 100 may perform the buffer flush operation.

The display apparatus 100 may first request a source providing the content, i.e., a server computer, to provide frames corresponding to the content, and perform buffer flushing upon receiving the frames. Buffer flushing is an operation of deleting all the frames stored in the buffer included in the reproducer of the display apparatus 100.

According to an embodiment of the disclosure, when the latency of the content is greater than the second latency threshold, the display apparatus 100 may transmit a request to provide an I-frame among frames, which are being transmitted from a source providing the content, to the source. When the display apparatus 100 performs buffer flushing, all of the frames stored in the buffer are discarded and thus the I-frame, which is a key frame, is necessary for the display apparatus 100 to receive and decode new frames. Thus, the display apparatus 100 may request the server computer providing the content to provide the I-frame.

GOP stands for a group of pictures that are default options of MPEG-1/2 encoding, and means a collection of frames from a key frame to a next key frame. There are I, B, and P as types of frames of the GOP, and each frame is encoded by a video codec by using one of three mode, i.e., an I-mode, a B-mode, and a P-mode. The I-frame is an abbreviation for an intra-frame and is a key frame. The I-frame is a frame with best image quality and thus is independently encoded without referring to other frames. The P-frame is an abbreviation for a predicted frame and is a frame configured with reference to information of a preceding key frame and having medium image quality and medium capacity. The B-frame is an abbreviation for a bidirectional frame and is a frame configured with reference to information of a preceding I/P-frame and a following I/P frame and having lowest image quality and lowest capacity. As such, frames constituting alternative content have different characteristics. When a main buffer is flushed, no frames are stored in the main buffer and thus it is necessary to request the I-frame, because a first frame can be decoded using the I-frame when new frames are received from the server computer.

According to an embodiment of the disclosure, upon receiving the requested I-frame from the server computer, the display apparatus 100 may perform buffer flushing and reproduce the content by decoding frames, starting from the received I-frame.

Figure 8:
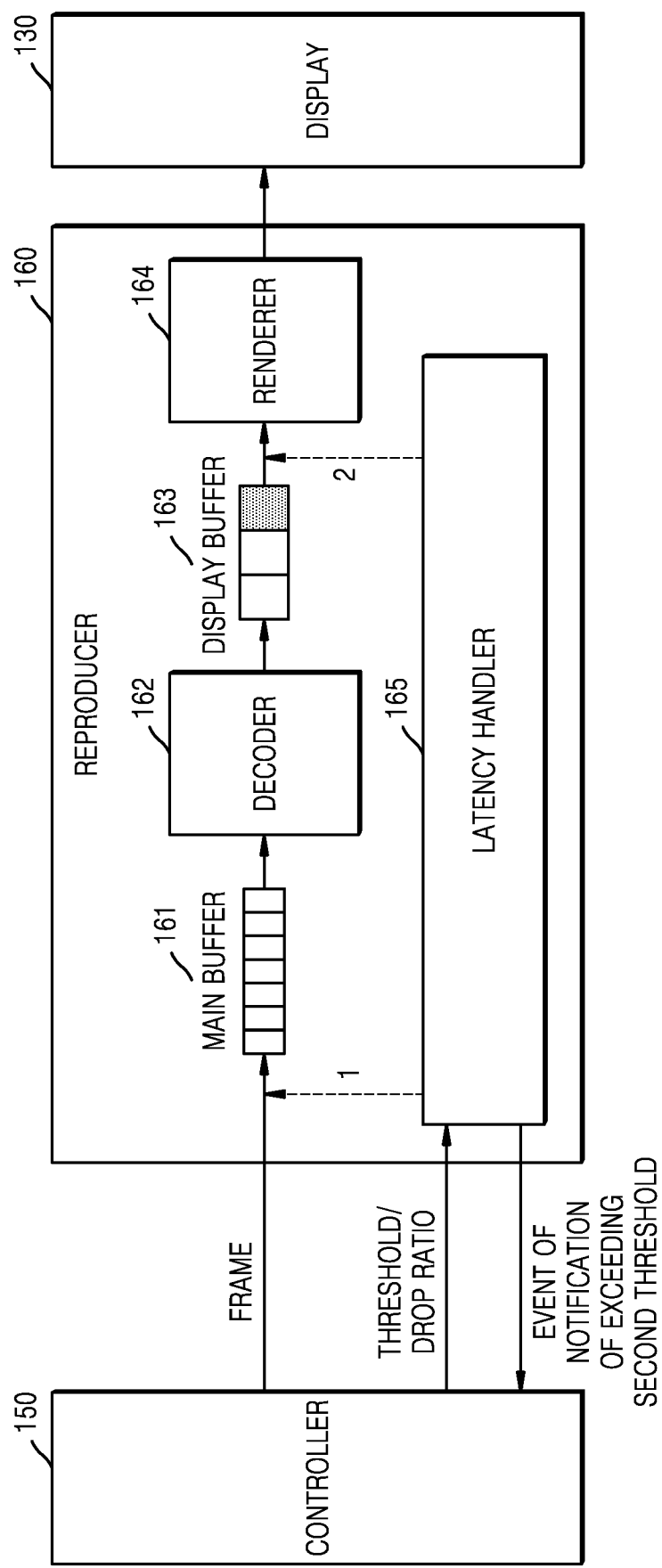
FIG. 8 is a detailed block diagram of a reproducer of FIG. 3 according to an embodiment of the disclosure.

FIG. 8 is a detailed block diagram of a reproducer of FIG. 3 according to an embodiment of the disclosure.

Referring to FIG. 8, the reproducer 160 may receive frames corresponding to content, which is requested to be reproduced, from the controller 150, process the frames, and output the processed frames to the display 130.

The reproducer 160 may include a main buffer 161, a decoder 162, a display buffer 163, a renderer 164, and a latency handler 165.

The main buffer 161 may store the frames received from the controller 150 and transmit the frames to the decoder 162.

The decoder 162 may decode the frames received from the main buffer 161 and output the decoded frames to the display buffer 163.

The display buffer 163 may store the decoded frames and output the decoded frames to the renderer 164.

The renderer 164 may receive the decoded frames from the display buffer 163, render the decode frames, and output data obtained by rendering the decoded frames to the display 130.

The frames received from the controller 150 may be displayed on the display 130 after passing through the main buffer 161, the decoder 162, the display buffer 163, and the renderer 164.

The latency handler 165 may continuously measure and monitor a latency of the content and perform the latency reduction operation according to a result of the monitoring while the received frames are decoded and displayed.

As the content requested to be reproduced is identified by the display apparatus 100, the latency handler 165 may receive setting information such as a first latency threshold, a second latency threshold, and a frame drop ratio from the content 150 and manage the information.

The latency handler 165 may measure the latency of the content reproduced by the reproducer 160. The latency may be variously determined. For example, the latency handler 165 may measure a current latency, based on the amount of frames stored in the main buffer 161 and the amount of frames stored in the display buffer 163. For example, when nine-second frames are stacked in the main buffer 161 and one-second frames are stacked in the frame buffer 163, the latency handler 165 may calculate a latency to be ten seconds. For example, the latency handler 165 may measure a current latency, based on the amount of frames stacked in the main buffer 161 and the amount of frames stacked in the display buffer 163.

As described above, the latency handler 165 may continuously measure and monitor a latency, and detect a latency greater than the first latency threshold. When a latency greater than the first latency threshold is detected, the latency handler 165 may control the display buffer 163 to drop decoded frames stored in the display buffer 163 according to information about a frame drop ratio received from the controller 150.

As described above, the latency handler 165 may control the display buffer 163 to stop the dropping of the frames when a latency less than the first latency threshold is detected during the dropping of the frames.

As described above, when the latency handler 165 detects a latency greater than the second latency threshold during the dropping of the frames, the latency handler 165 may transmit an event of reporting that the latency is greater than the second latency threshold to the controller 150.

Upon receiving the event, the controller 150 may perform an operation for reducing the latency. In other words, the controller 150 may request a server computer to provide an I-frame so as to receive new frames of content, and request the latency handler 165 to control buffer flushing while transmitting the I-frame to the main buffer 161 upon receiving the I-frame. The latency handler 165 receiving the request to control buffer flushing may control the main buffer 161 to delete all of the frames stacked in the main buffer 161.

Figure 9:
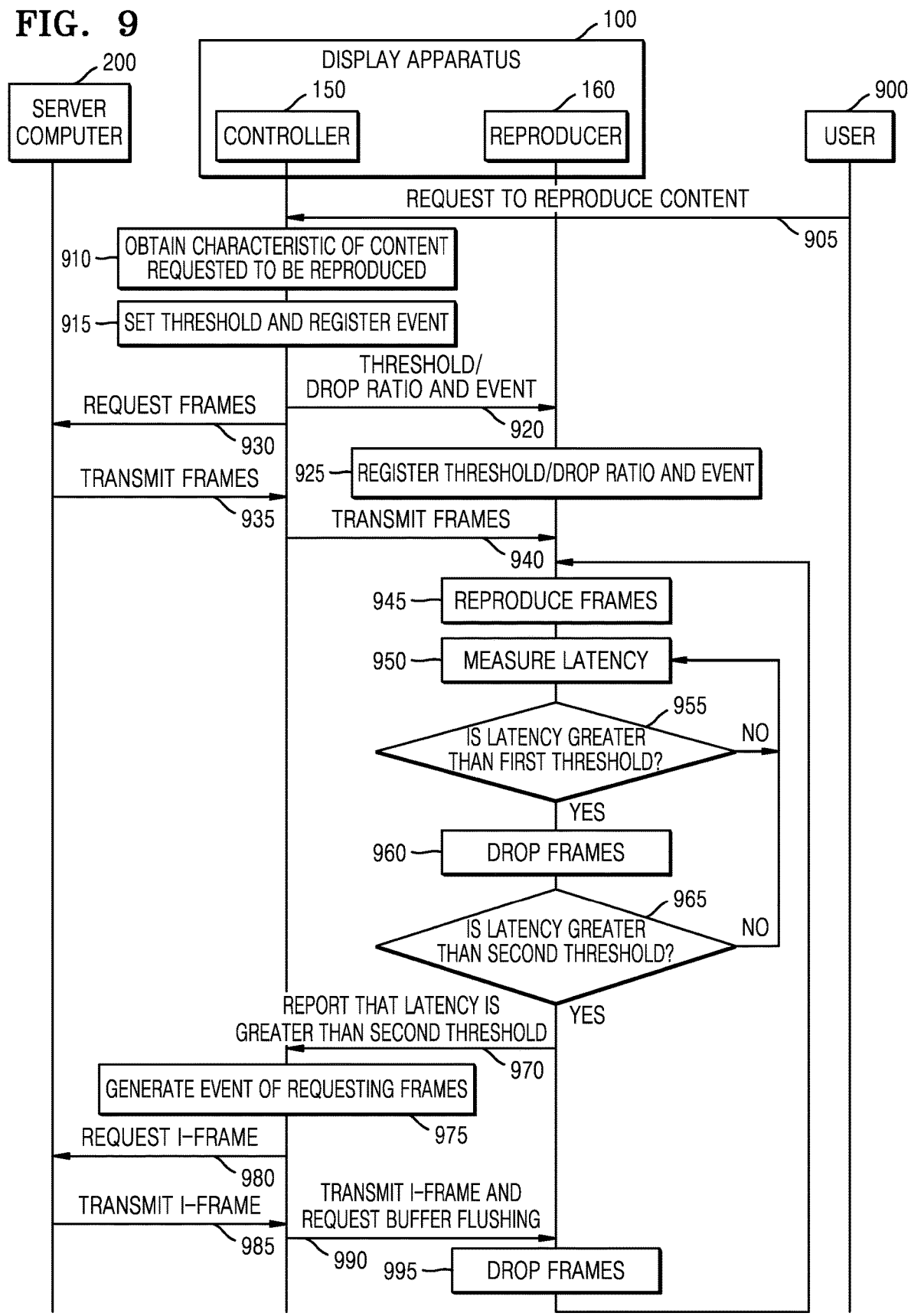
FIG. 9 is an example of a flowchart of an operating method of a display apparatus for performing a latency reduction operation according to an embodiment of the disclosure.

FIG. 9 is an example of a flowchart of an operating method of a display apparatus for performing a latency reduction operation according to an embodiment of the disclosure.

Referring to FIG. 9, in operation 905, the display apparatus 100 may receive a request to reproduce content from a user 900. The display apparatus 100 may provide a graphic user interface for selecting one or more content items and receive a user input to select one content item through the graphic user interface. An example of the graphical user interface for selecting one or more content items will be described with reference to FIG. 10 below.

Figure 10:
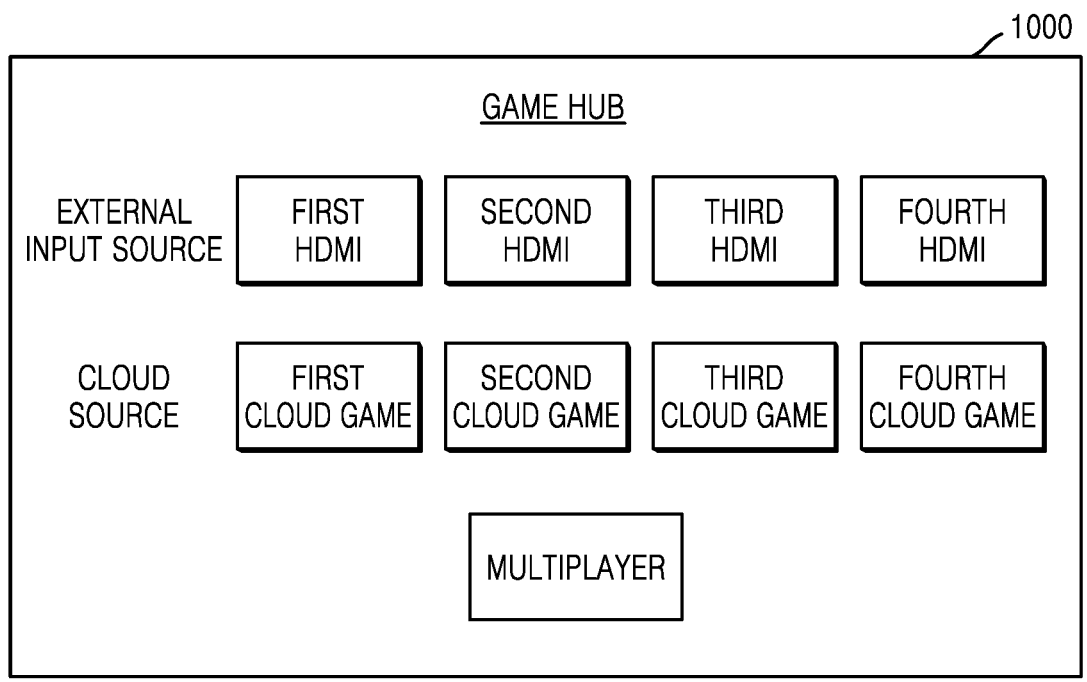
FIG. 10 illustrates a game hub, which is an example of a game-dedicated application platform that may be provided by a display apparatus, according to an embodiment of the disclosure.

FIG. 10 illustrates a game hub 1000, which is an example of a game-dedicated application platform that may be provided by the display apparatus 100, according to an embodiment of the disclosure.

Referring to FIG. 10, the game hub 1000 may provide one or more items for selecting an externa input source, one or more items for selecting a cloud source, and a variety of menus. A user may provide an input for selecting an item provided by the game hub 1000 to reproduce content corresponding to the item. For example, when the user provides an input for selecting a first cloud game item, the display apparatus 100 receives a request to reproduce game content corresponding to the first cloud game item.

In operation 910, upon receiving a request to reproduce content, the display apparatus 100 may obtain characteristic information of the content requested to be reproduced.

The display apparatus 100 may obtain the characteristic information of the content, which is requested to be reproduced, by various methods. According to an embodiment of the disclosure, the display apparatus 100 may store the characteristic information of the content in a memory. In this case, the display apparatus 100 may obtain the characteristic information of the content by reading the characteristic information of the content from the memory. According to an embodiment of the disclosure, the display apparatus 100 may obtain characteristic information of the content by requesting the server computer to provide metadata of the content requested to be reproduced and receiving the metadata of the content from the server computer. According to an embodiment of the disclosure, the display apparatus 100 may receive the metadata of the content by extracting a fingerprint through some frames or thumbnail information of the content requested to be reproduced and transmitting the extracted fingerprint to a fingerprint server, and obtain the characteristic information of the content from the received metadata.

Characteristic information of content related to the embodiments of the disclosure set forth herein may include information about a characteristic for determining a degree of latency impact on the content. For example, in the case of game content, a characteristic for determining the degree of latency impact may vary according to the type of the game content. For example, a shooting game such as the FPS is content for which a latency is significant and thus may be classified as content with a high latency impact. For example, in the case of a roll-playing game such as an RPG, seamless reproduction of content is more important than reducing latency, and thus, these games may be classified as content with a lower latency impact than that of FPSs.

In operation 915, the controller 150 of the display apparatus 100 may register a latency threshold, a frame drop ratio, and an event, based on the characteristic of the content.

The display apparatus 100 may set a threshold serving as a reference value for determining whether latency has increased and thus a measure should be taken, when the latency is monitored during reproduction of the content. Alternatively, the display apparatus 100 may set two thresholds, i.e., a first latency threshold and a second latency threshold, to more accurately design a reference value for determining whether a latency increases and thus a measure should be taken. The first latency threshold may be a latency threshold serving as a reference value for determining whether latency has increased and thus frame dropping should be performed, and the second latency threshold may be a latency threshold serving as a reference value for determining whether latency has further increased and thus buffer flushing should be performed because this problem cannot be fixed by frame dropping.

The display apparatus 100 may set the first latency threshold and the second latency threshold, based on the characteristic of the content requested to be reproduced. Specifically, when the characteristic of the content is a high latency impact, a threshold should be strictly managed and thus the controller 150 of the display apparatus 100 may set the first latency threshold and the second latency threshold to relatively small values. That is, in this case, frame dropping or buffer flushing may be performed immediately even when the latency is slightly greater than the first or second latency threshold. When the characteristic of the content is a low latency impact, a threshold may be less strictly managed and thus the controller 150 of the display apparatus 100 may set the first latency threshold and the second latency threshold to relatively large values. That is, in this case, frame dropping or buffer flushing may be performed only when the latency has exceeded the first or second latency threshold by a certain amount.

The display apparatus 100 may set a frame drop ratio for frame dropping to be performed when a latency is greater than the first latency threshold. The frame drop ratio may be a ratio or speed at which frames accumulated in a display buffer will be dropped.

The display apparatus 100 may determine the frame drop ratio, based on the characteristic of the content requested to be reproduced. Specifically, when the characteristic of the content is a high latency impact, a latency should be quickly reduced and thus the controller 150 of the display apparatus 100 may set the frame drop ratio to be high. When the characteristic of the content is a low latency impact, the latency may be relatively slowly reduced and thus the controller 150 of the display apparatus 100 may set the frame drop ratio to be low.

The display apparatus 100 may register an event of notification that the second latency threshold has been exceeded, so that when a latency is greater than the second latency threshold, this event may be received from the reproducer 160 and thus buffer flushing may be performed. In a case where the event of notification that the second latency threshold has been exceeded is registered and transmitted to the reproducer 160, when such a condition is satisfied, i.e., when a latency is greater than the second latency threshold, the reproducer 160 may generate an event of reporting this situation and transmit the generated event to the controller 150.

In operation 920, the controller 150 may transmit the set thresholds, i.e., the first latency threshold and the second latency threshold, the frame drop ratio, and the set event to the reproducer 160.

In operation 925, when the reproducer 160 receives the thresholds and the event from the controller 150, the latency handler 165 of the reproducer 160 may register the received thresholds and event.

In operation 930, the controller 150 may request the server computer 200 to provide frames of the content requested to be reproduced.

In operation 935, the controller 150 may receive the frames of the content requested to be reproduced from the server computer 200. In operation 940, the controller 150 may transmit the received frames to the reproducer 160.

In operation 945, the reproducer 160 may process the received frames through the main buffer 161, the decoder 162, the display buffer 163, and the renderer 164.

In operation 950, the latency handler 165 of the reproducer 160 may measure a latency of the content reproduced by the reproducer 160. In order to manage the latency of the content reproduced by the reproducer 160, the latency handler 165 may continuously and periodically measure and monitor the latency of the content during the reproducing of the content by the reproducer 160.

In operation 955, the latency handler 165 may determine whether the latency is greater than the first latency threshold while measuring and monitoring the latency. When the latency is not greater than the first latency threshold, operation 950 may be performed to repeatedly perform latency measurement.

In operation 960, the latency handler 165 may perform frame dropping when it is determined that the measured latency is greater than the first latency threshold. The latency handler 165 may control the display buffer 163 to drop some frames at the frame drop ratio received from the controller 150.

In operation 965, the latency handler 165 may determine whether the latency is greater than the second latency threshold by continuously monitoring the latency during performing of frame dropping. When it is determined that the latency is not greater than the second latency threshold, the latency handler 165 may proceed to operation 950 to measure a latency, determine whether the latency is greater than the first latency threshold, and determine whether to perform frame dropping according to a result of determining whether the latency is greater than the first latency threshold.

In operation 970, when it is determined that the latency is greater than the second latency threshold, the latency handler 165 may transmit the event of reporting that a latency is greater than the second latency threshold to the controller 150.

In operation 975, the controller 150 receiving the event of reporting that a latency is greater than the second threshold may generate an event of requesting the server computer 200 to provide new frames. In this case, the request to provide new frame may include a request to provide an I-frame. When the latency is greater than the second latency threshold, buffer flushing should be performed and frames at a point in time when the content has been reproduced should be newly received from the server computer 200 and be decoded, and thus, the I-frame, which is a key frame serving as a key to decoding frames, is required and thus is requested.

In operation 980, the controller 150 may transmit an event of requesting the server computer 200 to provide the I-frame. In operation 985, the server computer 200 may transmit the I-frame to the display apparatus 100.

In operation 990, the controller 150 may transmit the I-frame and a request to perform buffer flushing, which are received from the server computer 200, to the reproducer 160.

In operation 995, the reproducer 160 receiving the I-frame and the request to perform buffer flushing may perform buffer flushing and proceed to 945 to produce the received frames.

Some embodiments of the disclosure may be implemented in the form of a recording medium storing instructions executable by a computer such as program modules executable by a computer. A computer-readable medium may be a recording medium accessible by a computer and may include a volatile storage medium, a non-volatile storage medium, a removable storage medium, and a non-removable storage medium. Alternatively, the computer-readable medium may include a computer storage medium. Examples of the computer storage medium include a volatile medium, a nonvolatile medium, a separable medium, and a nonseparable medium implemented by a method or technique of storing information such as a computer-readable instructions, a data structure, a program module or other data.

The embodiments of the disclosure set forth herein may be embodied as a software (S/W) program including instructions stored in a computer-readable storage medium.

The computer is a device capable of calling an instruction stored in a storage medium and operating according to the embodiments of the disclosure set forth herein, based on the called instruction, and may include an electronic device according to the embodiments of the disclosure set forth herein.

The computer-readable storage medium may be provided as a non-transitory storage medium. Here, the term "non-temporary" should be understood to mean that the storage medium does not include a signal and is tangible but does not indicate whether data is stored in the storage medium semi-permanently or temporarily.

In addition, the operating methods according to the embodiments of the disclosure set forth herein may be provided by being included in a computer program product. The computer program product may be traded as a product between a seller and a purchaser.

The computer program product may include a software program and a computer-readable storage medium storing the software program. For example, the computer program product may include a product (e.g., a downloadable application) in the form of software program electronically distributed by a device manufacturer or an electronic market (e.g., Google Play Store or App Store). For electronic distribution of the computer program product, at least part of the software program may be stored in a storage medium or temporarily generated. In this case, the storage medium may be a storage medium of a server of the manufacturer, a server of the electronic market, or a storage medium of a relay server that temporarily stores the software program.

The computer program product may include a storage medium of a server or a storage medium of a device in a system including the server and the device. Alternatively, when there is a third device (e.g., a smart phone) capable of being communicatively connected to the server or the device, the computer program product may include a storage medium of the third device. Alternatively, the computer program product may include an S/W program transmitted from the server to the device or the third device or transmitted from the third device to the device.

In this case, the server, the device, or the third device may execute the computer program product to perform the methods according to the embodiments of the disclosure set forth herein. Alternatively, two or more among the server, the device, and the third device may execute the computer program product to perform the methods according to the embodiments of the disclosure set forth herein in a distributed method.

For example, the server (e.g., a cloud server or an artificial intelligence server) may execute the computer program product stored in the server to control the device communicatively connected thereto to perform the methods according to the embodiments of the disclosure set forth herein.

As another example, the third device may execute the computer program product to control the device communicatively connected thereto to perform the methods according to the embodiments of the disclosure set forth herein. When the third device executes the computer program product, the third device may download the computer program product from the server and execute the downloaded computer program product. Alternatively, the third device may execute the computer program product provided in a preloaded state to perform the methods according to the embodiments of the disclosure set forth herein.

As used herein, the term "unit" may represent a hardware component such as a processor or a circuit and/or a software component executable by the hardware component such as a processor.

The above description of the disclosure is intended to provide examples and it will be understood by those of ordinary skill in the art to which the disclosure pertains that various modifications may be made without changing the technical spirit or essential features of the disclosure. Therefore, it should be understood that the embodiments of the disclosure described above are merely examples in all respects and not restrictive. For example, each component described as a single type may be implemented in a distributed manner, and similarly, components described as distributed may be implemented in a combined form.

The scope of the disclosure should be defined by the following claims to be described below rather than the detailed description, and all changes or modifications derivable from the defined matters and scope of the claims and their equivalents should be construed as being included in the scope of the disclosure.

What is claimed is:

1. A display apparatus comprising:
   a display;
   a reproducer configured to reproduce content;
   a memory storing one or more instructions; and
   a processor configured to execute the one or more instructions stored in the memory to:
   based on content requested to be reproduced being a game content, identify a category of the game content from a plurality of categories;
   identify a latency threshold corresponding to the category, each category of the plurality of categories having a corresponding latency threshold;
   measure current latency of the content during reproduction of the content by the reproducer based on a number of frames stored in a buffer;
   determine whether the current latency of the content which is measured based on the number of frames stored in the buffer is greater than the latency threshold corresponding to the category; and
   based on determining that the current latency of the content is greater than the latency threshold, control the reproducer to drop at least some of frames corresponding to the content.

2. The display apparatus of claim 1, wherein the processor is further configured to execute the one or more instructions to:

determine a frame drop ratio corresponding to the category of the game content; and
control the reproducer to drop the at least some of frames according to the determined frame drop ratio, based on determining that the current latency of the content is greater than the latency threshold.

3. The display apparatus of claim 1, wherein the processor is further configured to execute the one or more instructions to:
obtain a second latency threshold for a buffer flush operation corresponding to the category of the game content; and
based on the current latency of the content being greater than the second latency threshold, request a source providing the content to provide frames corresponding to the content, and control the reproducer to perform the buffer flush operation so as to empty the buffer.

4. The display apparatus of claim 3, wherein the processor is further configured to execute the one or more instructions to, based on the current latency of the content being greater than the second latency threshold, request the source providing the content to provide an I-frame among the frames corresponding to the content.

5. The display apparatus of claim 4, wherein the processor is further configured to execute the one or more instructions to control the reproducer to perform buffer flushing based on the I-frame being received from the source.

6. The display apparatus of claim 1, wherein the reproducer comprises:
a main buffer configured to receive and store frames corresponding to the content;
a decoder configured to decode frames output from the main buffer;
a display buffer configured to receive and store the decoded frames;
a renderer configured to receive the stored decoded frames from the display buffer, and to render the decoded frames received from the display buffer; and
a latency handler configured to manage the current latency of the content.

7. The display apparatus of claim 6, wherein the latency handler is further configured to measure the current latency of the content, based on frames stored in the main buffer and frames stored in the display buffer.

8. The display apparatus of claim 6, wherein the display buffer is further configured to, based on determining that the current latency of the content is greater than the latency threshold, drop at least some of frames stored in the display buffer at a frame drop ratio corresponding to a latency reduction speed determined based on the obtained category of the game content.

9. The display apparatus of claim 6, wherein
the processor is further configured to execute the one or more instructions to:
obtain a second latency threshold for a buffer flush operation, based on the obtained category of the game content; and
the main buffer is further configured to, based on the current latency of the content being greater than the second latency threshold, perform the buffer flush operation to delete frames stored in the main buffer.

10. An operating method of a display apparatus, the operating method comprising:
based on content requested to be reproduced being a game content, identifying a category of the game content from a plurality of categories;
identifying a latency threshold corresponding to the category, each category of the plurality of categories having a corresponding latency threshold;
measuring current latency of the content during reproduction of the content based on a number of frames stored in a buffer;
determining whether the current latency of the content which is measured based on the number of frames stored in the buffer is greater than the latency threshold corresponding to the category; and
based on determining that the current latency of the content is greater than the latency threshold, controlling at least some of frames corresponding to the content to be dropped.

11. The operating method of claim 10, further comprising:
determining a frame drop ratio corresponding to the category of the game content; and
based on determining that the current latency of the content is greater than the latency threshold, controlling at least some of frames to be dropped according to the determined frame drop ratio.

12. The operating method of claim 10, further comprising:
obtaining a second latency threshold for a buffer flush operation corresponding to the category of the game content; and
requesting a source providing the content to provide the frames corresponding to the content and controlling a reproducer to perform the buffer flush operation so as to empty the buffer, when the current latency of the content is greater than the second latency threshold.

13. The operating method of claim 12, further comprising, based on the current latency of the content being greater than the second latency threshold, requesting the source providing the content to provide an I-frame among the frames corresponding to the content.

14. The operating method of claim 13, further comprising controlling buffer flushing to be performed based on the I-frame being received from the source.

15. A computer-readable recording medium having recorded thereon a program including one or more instructions to implement, on a computer, an operating method of a display apparatus, wherein the operating method of the display apparatus comprises:
based on content requested to be reproduced being a game content, identifying a category of the game content from a plurality of categories;
identifying a latency threshold corresponding to the category, each category of the plurality of categories having a corresponding latency threshold;
measuring current latency of the content during reproduction of the content by the reproducer based on a number of frames stored in a buffer;
determining whether the current latency of the content which is measured based on the number of frames stored in the buffer is greater than the latency threshold corresponding to the category; and
based on determining that the current latency of the content is greater than the latency threshold, controlling at least some of frames corresponding to the content to be dropped.

* * * * *